United States Patent
Brocco et al.

(10) Patent No.: US 7,058,170 B2
(45) Date of Patent: Jun. 6, 2006

(54) METHOD FOR OPERATING AND APPARATUS FOR A BACK-PLANE SUPPORTING REDUNDANT CIRCUIT CARDS

(75) Inventors: Matt Brocco, Debary, FL (US); Andrew Filtness, Longwood, FL (US); Haresh Jotwani, Longwood, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 703 days.

(21) Appl. No.: 10/159,205

(22) Filed: May 30, 2002

(65) Prior Publication Data

US 2002/0196805 A1   Dec. 26, 2002

Related U.S. Application Data

(60) Provisional application No. 60/294,201, filed on May 30, 2001.

(51) Int. Cl.
*H04M 3/00* (2006.01)
(52) U.S. Cl. .............. 379/279; 700/3; 700/82; 714/11
(58) Field of Classification Search ........... 379/269, 379/279; 700/3, 82; 714/10, 11, 12, 13, 714/14
See application file for complete search history.

(56) References Cited

U.S. PATENT DOCUMENTS

| | | | | | |
|---|---|---|---|---|---|
| 4,371,754 A | * | 2/1983 | De et al. | .................. | 714/10 |
| 4,466,098 A | * | 8/1984 | Southard | .................. | 714/12 |
| 4,633,039 A | * | 12/1986 | Holden | .................. | 379/32.01 |
| 4,912,698 A | * | 3/1990 | Bitzinger et al. | .......... | 370/244 |
| 5,136,498 A | * | 8/1992 | McLaughlin et al. | ........ | 700/79 |
| 6,308,286 B1 | | 10/2001 | Richmond et al. | .......... | 714/13 |

* cited by examiner

*Primary Examiner*—Harry S. Hong

(57) ABSTRACT

The present invention provides clear and robust arbitration of which of two system controllers is in control of a telecommunications switching system. Each system controller monitors and actively reports its status to a separate arbitration circuit. The resultant signal from the arbitration circuit tells the system which controller to obey. By feedback of its own output unnecessary switching or ill-defined control states are avoided. In particular, if either both or neither system controllers is reporting itself as OK, the system does not switch controllers. In addition, the arbitration circuit is fed redundant clock signals and support, making it effectively redundant.

9 Claims, 4 Drawing Sheets

TABLE 4-9 A/B SELECT SIGNAL GENERATION

| A OK | B OK | FORCE A | FORCE B | FEEDBACK A/B̄ SELECT | A/B̄ SELECT |
|---|---|---|---|---|---|
| X | X | 1 | 0 | X | 1 |
| 1 | 0 | 0 | 0 | X | 1 |
| 1 | 1 | 0 | 0 | 1 | 1 |
| 0 | 0 | 0 | 0 | 1 | 1 |
| X | X | 0 | 1 | X | 0 |
| 0 | 1 | 0 | 0 | X | 0 |
| 1 | 1 | 0 | 0 | 0 | 0 |
| 0 | 0 | 0 | 0 | 0 | 0 |

METHOD FOR OPERATING AND APPARATUS FOR A BACK-PLANE SUPPORTING REDUNDANT CIRCUIT CARDS

CROSS REFERNCE TO RELATED APPLICATIONS

This application claims the benefit of priority under 35 U.S.C. 119(e) to copending U.S. Patent Provisional Applications, Ser. No. 60/294,201 and filed on May 30, 2001, the contents of said application being incorporated by reference herein in its entirely.

This application is also related to the following U.S. patent applications: U.S. Patent application Ser. No. 10/159, 210 filed May 30, 2002 entitled AN INTEGRATED ACCESS PLATFORM: U.S. patent application Ser. No. 10/159,207 filed May 30, 2002 entitled METHOD AND APPARATUS OF TESTING A POTS CIRCUIT AND DSL CIRCUIT THROUGH A SPLITTER; U.S. patent application Ser. No. 10/157,436 filed May 30, 2002 entitled METHOD AND APPARATUS FOR LOADING A MIRROR IMAGE SOFTWARE COPY ACROSS CIRCUIT CARDS; U.S. patent application Ser. No. 10/159,204 filed May 30, 2002 entitled METHOD AND APPARATUS FOR A COMMON MANAGEMENT SOFTWARE SYSTEM; U.S. patent application Ser. No. 10/157,208 filed May 30, 2002 entitled METHOD AND APPARATUS FOR PROVIDING A COMMON TEXT MESSAGING SYSTEM WITHIN A SOFTWARE ARCHITECTURE; U.S. patent application Ser. No. 10/159,209 filed May 30, 2002 entitled METHOD AND APPARATUS FOR PROVIDING A STATE MACHINE OPERATING ON A REAL-TIME OPERATING SYSTEM; and U.S. patent application Ser. No. 10/159,206 filed May 30, 2002 entitled METHOD AND APPARATUS FOR ADMINISTERING MULTIPLE PROVISIONABLE OBJECTS, the contents of each of said applications being incorporated by reference herein in their entirely.

FIELD OF THE INVENTION

The present invention relates to communications systems control utilizing redundant controllers. More particularly, the present invention relates to an apparatus for supporting at least one redundant system controller in telecommunications switching systems and methods for operating said apparatus.

BACKGROUND OF THE INVENTION

Telecommunications systems, such as the Public Switched Telephone Network, are typically built as large scale centralized networks in which transmission facilities linking customers are interconnected though switching centers. A primary requirement of such complex systems is a high degree of reliability, which is usually accomplished by having redundant equipment, including redundant transmission paths, redundant nodes and redundant equipment at each node. The redundant equipment or components are often added to the system as spare or backup equipment.

Each of the interconnecting switching centers or nodes within a communications network is typically a rack or cabinet of electronic routing equipment. Within that cabinet there is usually at least one redundant local system controller capable of controlling the operation of the entire rack or subsystem and it's functioning within the network.

In such architectures, a significant design concern is how to determine when control of the routing rack should be switched from one local system controller to the spare or backup system controller.

Generally, when a system includes spare components, a redundancy switchover controller monitors the status of operating components. When the redundancy switchover controller determines that a component is failing, the controller inserts a backup or redundant component into the system to replace the failed unit by operating switches connected to the inputs and outputs of the failed component and the spare component. However, a problem arises if the component that is failing is the system controller itself or the component tasked with monitoring operational status. In such cases, the problem to be solved is how the failed component is going to detect the need for changeover and effect the switch over.

If a separate, active component is added to monitor and determine which of the two control cards should be in charge, system reliability is compromised by the possible failure of this non-redundant active monitoring and arbitration circuit.

Another approach to the problem is to delegate the decision making to the spare component, as discussed in U.S. Pat. No. 6,308,286. In such systems, each spare component (and possibly a plurality of them) monitors the system itself and determines when a component that it is standing by for fails. The spare component then inserts itself into the system. However, when the spare component is the system controller, this approach has major flaws. One fatal scenario occurs when a faulty off-line or spare component makes the incorrect determination that the functioning on-line controller has failed and inserts itself, a faulty controller, on-line. A clearly unstable state of continuous switching between the two controllers results.

There is a clear need for a simple method to determine which of two of redundant system controllers should be the one in control that does not compromise the overall systems reliability. Such a method should particularly avoid unstable system states.

SUMMARY OF THE INVENTION

Accordingly, the present invention has been made in view of the above mentioned needs and has the advantage of clearly and simply arbitrating system control while maintaining system reliability.

In the present invention clarity of control is preserved in a system having redundant system controllers by having each system controller monitor itself and actively report its status to a third board containing arbitration logic. This third board is kept reliable by having all support services to it, including power and clock signals, be redundant. This combination of self-monitoring and active reporting by the boards to each other and to a separate, essentially passive and support redundant arbitration board, allows for clear control with no unstable states while maintaining a high level of reliability.

The present invention may be characterized in one embodiment as a system that includes at least two, functionally redundant system control circuit cards on a common backplane of a communications system containing a plurality of circuit cards. Each of the system control circuit cards in the system of the present invention is capable of monitoring its own status and, if functioning appropriately, reporting that status as an OK status signal to a separate arbitration circuit or control panel. The output of that arbitration circuit is a signal that effectively tells the communications system which system controller is in control.

The method of this invention includes the redundant system controllers sending timing clock signals to the board containing the arbitration logic circuit. The arbitration logic is made essentially passive as the status of each of the system controllers is reported to it, and not obtained by active interegation. It is also made support redundant by having redundant clock signals fed to it, so that in the case of one clock failing, the arbitration logic can still function. The arbitration logic circuit is configured so that manual overrides can select which of the system controllers is used. The arbitration logic circuit ensures that if only one of the redundant controllers is signaling an OK status, then that controller is the one set to be on-side or used by the system. The arbitration logic further ensures that if both system controllers are signaling OK, that the one that is already on-side, i.e. the one that is already in control, stays on-side. This is accomplished by having the arbitration logic, in the case where both controllers are signaling the same OK status, feedback its output as a tie-breaker in such a way that the controller that is already on-side, stays on-side. This ensures that if both system controllers are signaling an OK status, or neither system controller is signaling an OK status, the controller currently in use remains in use. This prevents unnecessary switching of control and provides safe, simple method to determine which of a plurality of redundant system controllers should be the one in control while avoiding unstable system states or compromises to system reliability.

BRIEF DESCRIPTION OF THE DRAWINGS

The foregoing and other objects, features and advantages of the present invention will be more readily appreciated upon reference to the following disclosure when considered in conjunction with the accompanying drawings in which.

DETAILED DESCRIPTION

During the course of this description like numbers will be used to identify like elements according to the different figures that illustrate the inventions.

The present invention is a safe, simple method to determine which of a plurality of redundant system controllers should be the one in control while avoiding unstable system states or compromises to system reliability.

Figure 1:
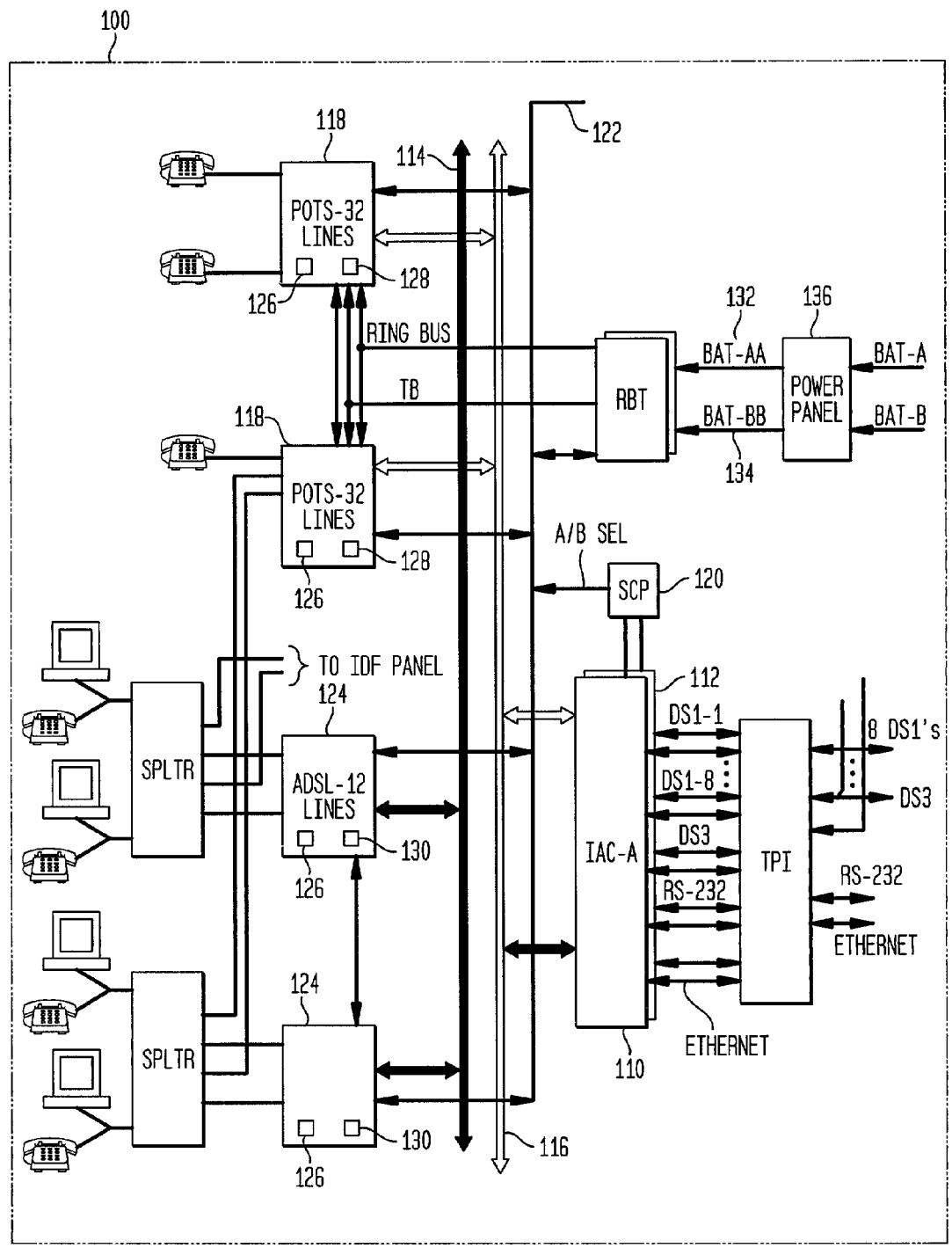
FIG. 1 is a schematic drawing of a telecommunications switching system having redundant system control circuit cards.

FIG. 1 is a schematic drawing of a telecommunications switching system 100, which is typically a digital system, having a plurality of redundant features and elements including redundant system control cards, Integrated Access Controller A (IAC-A) 110 and Integrated Access Controller B (IAC-B) 112 communicating with each other as well as a plurality of assorted circuit cards, such as POTS-32 line cards 118, and ADSL-12 line cards 124, over the back-plane wiring comprising redundant broadband bus 114, redundant narrowband bus 116 and redundant maintenance bus 122. The telecommunications switching system 100 also has a System Control Panel (SCP) 120 which incorporates arbitration logic for determining which of system control cards, IAC-A 110 or IAC-B 112 is in control. In the illustrated embodiment system control cards IAC-A 110 and IAC-B 112 are redundant controllers for controlling the narrow band and broadband functions of an integrated telecommunications platform providing a full range of data and voice services by means of a plurality of assorted circuit cards, such as a POTS-32 line card 118 or an ADSL-12 line card 124, examples of which are manufactured by the Siemens Corporation. These system control cards operate in a Worker/Standby mode, exchanging appropriate signals via the backplane wiring of the maintenance bus 122 to determine when a fault occurs necessitating a change of which of the control cards, IAC-A 110 or IAC-B 112 is in control. This process of redundant system controllers exchanging data with each other is sometimes called checkpointing. The process of changing control between redundant system controllers is sometimes called switching sides. The line cards, such as the POTS-32 line card 118, or the ADSL-12 line card 124, typically have a microprocessor subsystem 126 for processing operations, administration and maintenance on their respective boards or for handing signaling and control functions on their respective boards. Power panel 136 feeds two lines of power, power source A 132 and power source B 134 to the system. SCP 120 receives one of power source A 132 or power source B 134 through one of control cards IACA 110 or IAC-B 112.

Figure 2:
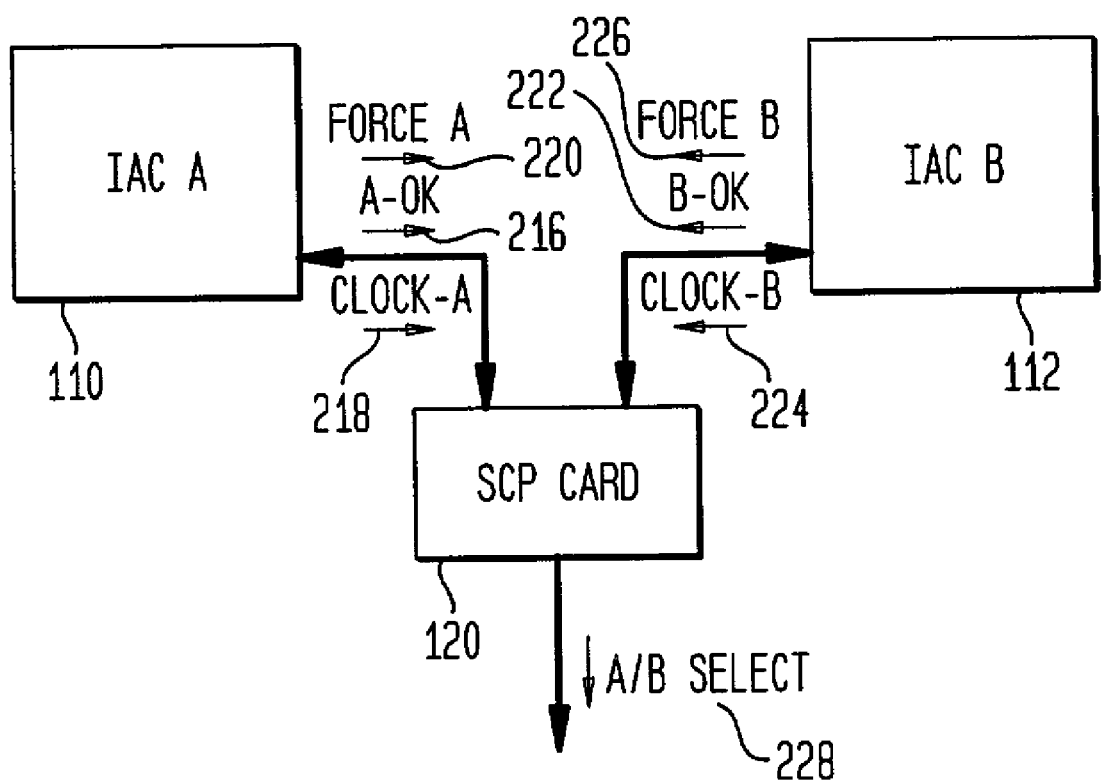
FIG. 2 is a schematic drawing of a system for arbitrating use of redundant system control circuit cards.

FIG. 2 is a schematic drawing of a system for arbitrating use of redundant system control cards comprising a system control circuit card or Integrated Access Controller A (IAC-A) 110 and system control circuit card Integrated Access Controller B (IAC-B) 112. These control cards are functionally equivalent to each other and both are connected to a System Control Panel (SCP) card 120 which incorporates an essentially passive arbitration circuit, later described and shown in FIGS. 3 and 4. IAC-A 110 has means for sending status signals comprising an A-OK signal 216, a Clock A signal 218 and a Force A signal 220 to SCP 120. Similarly, IAC-B 112 has means for sending status signals comprising a B-OK signal 222, a Clock B signal 224, and a Force B signal 226 to SCP 120. The A and B-OK signals 216 and 222 are digital signals and can have one of two states. For instance A-OK signal 216 may have a value of 1 indicting it is true, indicating that the IAC-A 110 is functioning correctly or it may have a value of 0 indicating that it is false and that the IAC-A is not functioning correctly. Software on each of IAC-A 110 and IAC-B 112 is responsible for setting its own OK bit after startup is complete. That OK bit is cleared by IAC hardware on any reset except a software warm reset. The Clock A signal 218 and Clock B signal 224 are typically constant frequency outputs used for synchronizing other system elements, but may also be used for counting elapsed time from a previous event. In the illustrated embodiment, the Clock A signal 218 and Clock B signal 224 routed to SCP card 120 have different frequencies and are exclusively "ORed" on the SCP card 120. If either of the Clock A or Clock B signals fails to reach the SCP card, the arbitration circuit 400 on SCP card 120 will continue to function since the SCP card 120 itself will normally use the on-side IAC clock and will switch to the off-side IAC if that clock fails. Since the SCP card is also redundantly fed one of either power source A 132 or power source B 134, the arbitration circuit 400 on SCP card 120 (shown in FIG. 4) is essentially redundant. The Force A and Force B signals, 220 and 226 respectively, are essentially hardware manual switch status signals that indicate whether or not a hardware override switch setting has been selected. These signals are typically relayed to the SCP 120 by the on-side IAC.

The A/B Select signal 228 is output by the arbitration circuit 400 on the SCP card 120. This A/B Select signal 228 is also a digital signal which may have one of two possible states, usually represented by 1 or 0. This A/B Select signal 228 is sent to all other cards in the telecommunications switching 110 and instructs them as to which of the two redundant system control cards, either IAC-A 110 and IAC-B 112, they should transmit and receive communications and instructions. For instance, a "0" value A/B Select signal 228 may cause IAC-B 112 to be the system card in control. All processor based boards in the telecommunications switching system 110 receive an interrupt signal whenever an IAC switchover takes place. Interrupt handling is then board-dependant for each of the circuit cards within switching system 110. Typically, the microprocessor subsystem 126 on each processor-based board, which may for instance be a programmed version of the well known MPC850 chip, interprets the A/B Select signal 228 and carries out the switching function, either "on" or "off" for that circuit card. Side switching is accomplished by each microprocessor subsystem 126 initiates appropriate tasks on its board, such as restarting the board or making appropriate changes to Event Control Blocks (ECB), including audits and initialization. Transmission of such changes by the microprocessor subsystem 126 to the Event Control Blocks (ECB), which are typically software routines, is sometimes referred to as eventing the ECBs. The ECBs typically control elements on the circuit cards such as for instance the Subscriber Line Interface Circuits (SLICs) 128 on POTS-32 line card 118 or the Asynchronous Transfer Mode (ATM) switching chip 130 on ADSL-12 line card 124. By making suitable changes to the ECBs, all the necessary elements on the circuit cards are informed of which controller card to respond to, either IAC-A 110 or IAC-B 112.

In the illustrated embodiment A-OK signal 216 and B-OK signal 222 are generated by software. The A-OK signal 216 and B-OK signal 222 can also be cleared by software and hardware as a result of any one or more of a number of wellknown sanity check circuits and software routines present on IAC-A 110 and IAC-B 112, for example alive timers, watchdog timeouts (WDTO), or other hardware and/or software faults detected by the hardware/software on those boards.

Figure 3:
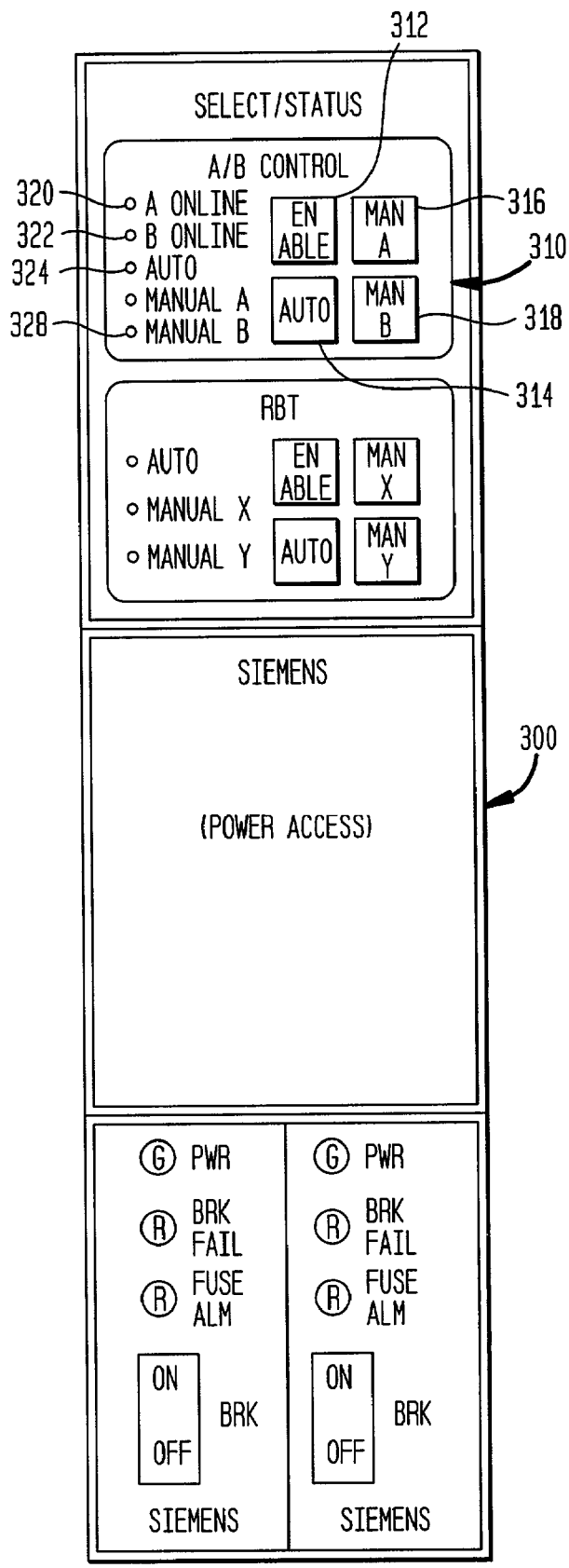
FIG. 3 is a schematic drawing showing the power panel of the telecommunications switching system.

In the illustrated embodiment the system may be controlled from a power panel 300 as shown schematically in FIG. 3. Part of the power panel 300 is the A/B Selection Panel 310 comprising an enable switch 312, an auto switch 314, a manual A switch 316 and a manual B switch 318. In addition, the A/B Selection Panel 310 has status lights to indicate the status of control of the telecommunications switching system 100, including an A Online status light 320, a B Online status light 322, an auto status light 324, an A Manual status light 326 and a B Manual status light 328. The pushbutton switches 312, 314, 316 and 318 may be used to force a selection of the A/B Selection Panel's, 310, status. Under normal operating conditions the system runs in auto selection mode. Auto selection mode can be forced by pressing Enable switch 312 and Auto switch 314. Auto selection mode is indicated on the A/B Selection Panel 310 by a green LED, Auto status light 324, lighting up. In auto selection mode, arbitration logic on arbitration circuit 400, and described in detail in connection with FIG. 4, determines the state of the A/B Select signal 228 and hence the status of the A/B Selection Panel 310. The active, on-line side so selected according to the auto selection mode is indicated by the lighting of a greed LED online status on either A Online status light 320 or B Online status light 322.

Either IAC-A 110 or IAC-B 112 can be manually forced to be the controller, thereby overriding any software or auto-selection choice. For instance by pressing Enable switch 312 and A Manual switch 316, the telecommunications switching system 100 is forced to use IAC-A 110 as the system control card. This state is indicated on the A/B Selection Panel 310 when the Manual A status indicator light 326, a red LED, lights up.

Figures 4, 5:
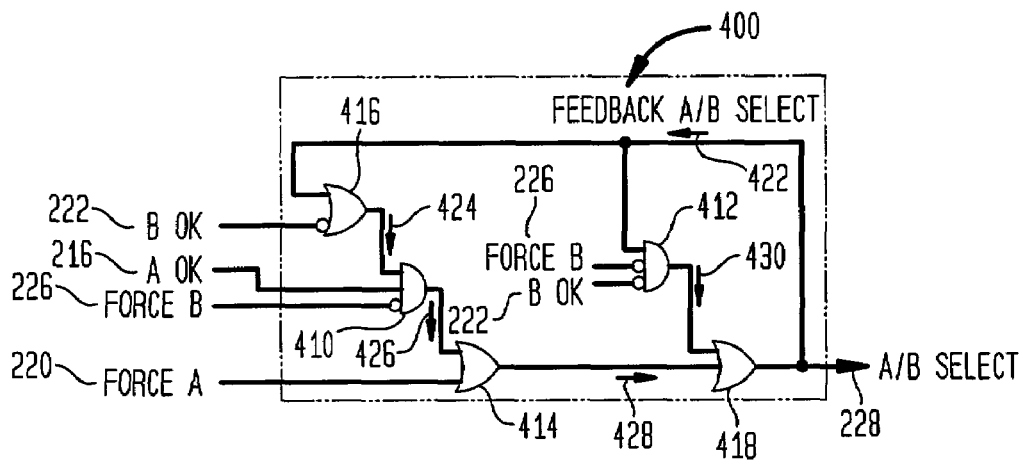
FIG. 4. is a schematic drawing of the control logic of the arbitration circuit.
FIG. 5. is a truth table for the control logic of the arbitration circuit.

FIG. 4 is a schematic drawing of the control logic of the essentially passive arbitration circuit 400 contained on SCP card 120. The inputs to the control logic comprise four signals: A-OK signal 216, B-OK signal 222, Force A signal 220 and Force B signal 226. A-OK signal 216, B-OK signal 222 are supplied by their respective system control cards, IAC-A 110 or IAC-B 112 respectively. Force A signal 220 and Force B signal 226 are activated when the appropriate button switches on the A/B Selection Panel 310 are pushed, as explained above. The Force A and Force B signals are relayed to the SCP 120 by the on-side IAC. The arbitration circuit 400 consists of an interconnected set of logical gates, or their functional equivalent, comprising a first AND gate 410, a second AND gate 412, a first OR gate 416, a second OR gate 414 and a third Or gate 418. The first OR gate 416 takes the fed back output of the arbitration circuit as the Feedback A/B select signal 422 and OR's it with the inverted B-OK signal 222. This first resultant signal 424 is then fed into the first AND gate 410 along with the A-OK signal 216, and the inverted Force B signal 226. The output of first AND gate 410, the second resultant signal 426 is then fed into the second OR gate 414 along with the Force A signal 220. The output of the second OR gate 414, the third resultant signal 428 is fed into the third OR gate 416 along with the output of the second AND gate 412, forth resultant signal 430. Forth resultant signal 430 is the resultant of ANDing together Feedback A/B select signal 422 along with Force B signal 226 and B-OK signal 222. The output of third OR gate 418 is the A/B Select signal 228.

The truth table shown in FIG. 5 provides the status the resultant signal A/B Select signal 228 for all possible state of the input signals and the Feedback A/B Select signal 422 according to the arbitration circuit 400. In the truth table of FIG. 5 each input can have three states, namely 1 (true), 0 (false) or x (unavailable). For each of these states, the output A/B Select signal 228 is always in a well defined state of 1 or 0 showing that the selection of the system control card is always well-defined. When A/B Select signal 228 is 1, IAC-A 110 is in control of the system, and when A/B Select signal 228 is 0, IAC-B 112 is in control.

The resultant effect on the of the essentially passive arbitration circuit 300 contained on SCP card 120 as expressed in the truth table of FIG. 5, is to provide the following functionality, in descending order of precedence:

A manual switch, either A Manual switch 316 or B Manual switch 318 forces the Selected IAC-A 110 or IAC-B 112 to be the system controller, sometimes referred to as forcing the selected side on-line.

If only one of IAC-A 110 and IAC-B 112 is asserting an OK signal, A-OK signal 216 or B-OK signal 222, then that will be the system controller. This is sometimes referred to as if there is only one side that is OK, the current OK and online side will stay on-line.

If both IAC-A 110 and IAC-B 112 are asserting an OK signal, A-OK signal 216 or B-OK signal 222, then the current system controller remains the system controller. This is sometimes referred to as if both sides are OK, the current on-line side will stay on-side.

If neither IAC-A 110 and IAC-B 112 are asserting an OK signal, A-OK signal 216 or B-OK signal 222, then the current system controller remains the system controller. This is sometimes referred to as if neither side is OK, the current on-line side will stay on-side. This prevents unnecessary side switching.

The combined result of this logic and the supply of redundant clocks and services to the arbitration circuit 400 provides a safe and simple method to determine which of the two redundant system controllers should assume or remain in control while avoiding unstable system states that compromise system reliability. While the invention has been described with reference to an illustrated embodiment, it will be appreciated by those of ordinary skill in the art that various modifications can be made to the steps of the method and the apparatus of the invention without departing from the spirit and scope thereof.

We claim:

1. An apparatus for supporting a first system control circuit card and a second system control circuit card capable of providing substantially identical functions as said first system control circuit card, on a common backplane of a microprocessor-based telecommunications switching system containing a plurality of circuit boards, said apparatus comprising:
   a system control panel;
   first signaling means capable of conveying a first OK status signal indicative of said first system control circuit card's operational status to said system control panel;
   second signaling means capable of conveying a second OK status signal indicative of said second system control circuit card's operational status to said system control panel;
   arbitration means capable of comparing said first OK status signal and said second OK status signal and producing a resultant signal, said arbitration means being supplied with a plurality of clock signals and power sources; and,
   switching means capable of using said resultant signal to cause said telecommunications switching system to select to use one of said first system control circuit card and a second system control circuit card;
   wherein said arbitration means feeds said resultant signal output from said arbitration means back as an input to said arbitration means in order to determine which of said first system control circuit card and said second system control card is a current system controller and ensure that when said first OK status signal and said second OK status signal are either both true or both false, said current system controller remains as said current system controller.

2. The apparatus of claim 1 wherein said telecommunications switching system is digital.

3. The apparatus of claim 2 wherein said first signaling means and said second signaling means comprise software set bits.

4. The apparatus of claim 3 wherein said switching means includes eventing means capable of informing all elements of said circuit boards in said telecommunications switching system requiring knowledge of said switching, which of said redundant circuit cards to select to use.

5. The apparatus of claim 4 wherein said switching means includes interrupt means for generating an interrupt signal to all said elements of said circuit boards in said telecommunications switching system, said interrupt signal causing initialization and data auditing of said circuit boards.

6. A method for supporting a first system control circuit card and a second system control circuit card capable of providing substantially identical functions as said first system control circuit card, on a common backplane of a microprocessor-based telecommunications switching system containing a plurality of circuit boards, and a system control panel with arbitration circuitry, said arbitration circuitry being capabable of signaling said plurality of circuit boards to select to use one of said first system control circuit card and said second system control circuit card, said method comprising the steps of:
   a. signaling a first OK status signal indicative of said first system control circuit card's operational status to said system control panel and a second OK status signal indicative of said second system control circuit card's operational status to said system control panel;
   b. supplying said arbitration circuitry with a plurality of power sources;
   c. arbitrating by using said arbitration circuitry and a plurality of clock signals to compare said first OK status signal and said second OK status signal and producing a resultant signal;
   d. feeding said resultant signal output from said arbitration means back as an input to said arbitration means in order to determine which of said first system control circuit card and said second system control circuit card is a current system controller and ensure that when said first OK status signal and said second OK status signal are either both true or both false, said current system controller remains as said current system controller; and
   e. utilizing said resultant signal to cause said telecommunications switching system to select to use one of said first system control circuit card and a second system control circuit card.

7. The method of claim 6 wherein said communications system is digital.

8. The method of claim 7 wherein said signaling step (a) includes:
   e. the step of providing software set bits.

9. The method of claim 8 wherein said utilizing step (c) further includes:
   the step of interrupting said circuit boards in said telecommunications switching system, said interrupting causing initialization and data auditing on said circuit boards.

* * * * *